United States Patent
Jensen

(10) Patent No.: US 7,052,274 B2
(45) Date of Patent: May 30, 2006

(54) METHOD AND PLANT FOR MANUFACTURING CEMENT CLINKER

(75) Inventor: Lars Skaarup Jensen, Valby (DK)

(73) Assignee: F L Smidth A/S, Copenhagen (DK)

( * ) Notice: Subject to any disclaimer, the term of this patent is extended or adjusted under 35 U.S.C. 154(b) by 13 days.

(21) Appl. No.: 10/505,653

(22) PCT Filed: Feb. 6, 2003

(86) PCT No.: PCT/EP03/01164

§ 371 (c)(1), (2), (4) Date: Aug. 24, 2004

(87) PCT Pub. No.: WO03/074956

PCT Pub. Date: Sep. 12, 2003

(65) Prior Publication Data

US 2005/0181322 A1    Aug. 18, 2005

(30) Foreign Application Priority Data

Mar. 7, 2002    (DK) ................ PA 2002 00345

(51) Int. Cl.
*F27B 15/02*    (2006.01)
(52) U.S. Cl. .................................. 432/58; 432/14
(58) Field of Classification Search ............. 432/58, 432/14, 106; 106/739, 745
See application file for complete search history.

(56) References Cited

U.S. PATENT DOCUMENTS

| | | | |
|---|---|---|---|
| 4,014,641 A | | 3/1977 | Shigeyoshi et al. ........... 432/58 |
| 5,919,038 A | * | 7/1999 | Labelle et al. ................ 432/14 |
| 6,012,918 A | * | 1/2000 | Doumet ....................... 432/106 |
| 6,733,283 B1 | * | 5/2004 | Skaarup Jensen et al. .... 432/14 |

FOREIGN PATENT DOCUMENTS

| | | |
|---|---|---|
| EP | 0882687 | 12/1998 |
| FR | 2542434 | 9/1984 |
| WO | 9730003 | 8/1997 |
| WO | 0216849 | 2/2002 |

* cited by examiner

*Primary Examiner*—Gregory Wilson
(74) *Attorney, Agent, or Firm*—Baker Botts LLP

(57) ABSTRACT

A method and plant for manufacturing cement clinker are disclosed, in which cement raw meal is calcined in a calciner. The calciner comprises an upper zone and a lower zone, where fuel, combustion gas and raw meal are introduced into the upper zone of the calciner and directed downward through the calciner. The combustion gas and raw meal are introduced tangentially into the calciner and subject to rotation follow a spiral-shaped flow path, and, under the action of gravity, the raw meal is primarily directed down along the wall of the calciner. The rotation of the combustion gas in at least the lower zone of the calciner is subjected to braking and approximately simultaneously or subsequently at least some of the combustion gas and at least some of the raw meal in the lower zone of the calciner is directed in the direction towards the center-line of the calciner.

6 Claims, 3 Drawing Sheets

METHOD AND PLANT FOR MANUFACTURING CEMENT CLINKER

CROSS-REFERENCE TO RELATED APPLICATIONS

This application claims priority from Denmark Patent No. 2002 00345 filed on Mar. 7, 2002 and from PCT application number PCT/EP03/01164 filed on Feb. 6, 2003, the disclosures of which are incorporated herein by reference.

BACKGROUND OF THE INVENTION

The present invention relates to a method for manufacturing cement clinker by which method cement raw meal is calcined in a calciner comprising an upper zone and a lower zone, where fuel, combustion gas and raw meal are introduced into the upper zone of the calciner and directed downward through the calciner, where the combustion gas and raw meal are introduced tangentially into the calciner and subject to rotation follow a spiral-shaped flow path, and where, under the action of gravity, the raw meal is primarily directed down along the wall of the calciner. The invention also relates to a plant for carrying out the method.

A plant of the above-mentioned kind for manufacturing cement is well known from the literature.

A kiln plant of the Separate Line Calcinator Downdraft type (SLC-D) is known for example from the U.S. Pat. No. 4,014,641 and WO 97/30003. This type of plant comprises a calciner, which is configured as a chamber which at its lower end is connected to an upward directed gas duct which is also connected to the outlet end of the kiln for exhaust gases. Also known from international patent application No. PCT/IB01/01296 is a kiln plant of the In Line Calcinator Downdraft type (ILC-D) where the calciner consists in the main of one big chamber. It is a common feature for the two types of plant that most of the fuel used in the calciner is injected axially at the top of the calciner. Preheated air from the clinker cooler and preheated raw meal are introduced tangentially into the top of the calciner. In the kiln plant of the type ILC-D, the exhaust gases from the kiln are also introduced tangentially into the top of the calciner, typically at a location above the point at which the preheated air is introduced in order to establish a $NO_x$-reducing zone at the uppermost part of the calciner. In both types of plant the fuel is thus burned primarily in a zone around the centre-line of the calciner, while, due to the tangential method of introduction, the raw meal and combustion air will flow downward through the calciner along a spiral-shaped path, thereby thrusting the raw meal towards the calciner wall, causing it to slide down along the wall under the action of gravity. As a consequence hereof, simultaneously with the calcination process, the raw meal will effectively protect the lining in the calciner. Advantages of these known types of plant are that fuels with a low content of volatile constituents can be used and that formation of $NO_x$ is at a relatively low level. However, it is a distinct disadvantage of such kiln plants that optimum calcination of the raw meal discharged from the calciner has not been achieved. Also, the exhaust gases exiting the calciner may contain unburned fuel, of which a major part will be in the form of CO, which will be ascribable to the fact that the combustion air is not mixed with the fuel to the extent required to provide the necessary air surplus across the entire cross-sectional area of the calciner.

SUMMARY OF THE INVENTION

It is the objective of the present invention to provide a method as well as a plant for manufacturing cement by means of which it will be possible to achieve a high calcination efficiency of the raw meal as well as a high fuel combustion efficiency in the calciner.

This is obtained by a method of the kind mentioned in the introduction and being characterized in that the rotation of the combustion gas in at least the lower zone of the calciner is subjected to braking and in that approximately simultaneously or subsequently at least some of the combustion gas and at least some of the raw meal in the lower zone of the calciner is directed in the direction towards the centre-line of the calciner.

Hereby is obtained an improvement in the calcination efficiency of the raw meal and the fuel combustion efficiency in the calciner. This is due to the fact that the raw meal and the oxygen-containing air being closest to the calciner wall will thus be more effectively mixed with the hotter exhaust gases and the fuel being in the central zone of the calciner, which means that the raw meal will absorb a greater amount of heat from the exhaust gases and the fuel will burn out when brought into contact with the oxygen-containing air.

The plant for carrying out the method according to the invention is of the kind which comprises a substantially rotation-symmetrical calciner with an upper zone and a lower zone, which calciner comprises means for introducing fuel into the upper zone of the calciner and means for tangential introduction of combustion gas and raw meal into the upper zone of the calciner, and being characterized in that it comprises means for braking the rotation of the combustion gas at least in the lower zone of the calciner, and means for approximately simultaneous or subsequent diversion of at least some of the combustion gas and at least some of the raw meal in the lower zone of the calciner in direction towards the centre-line of the calciner.

In a preferred embodiment the means comprise a number of internal fittings formed with vertical side faces and an inclined top face. The vertical side faces as well as the inclined top faces are substantially plane in order to facilitate any cleaning thereof from the outside. The internal fittings may be formed as right-angled circle sections. In a particularly preferred embodiment the plant comprises four internal fittings constituting between them a cross-shaped free space.

Additional characteristics of the present invention will appear from the following detailed description and the drawing.

BRIEF DESCRIPTION OF THE DRAWINGS

The invention will be explained in further details in the following with reference being made to the drawing where.

DETAILED DESCRIPTION OF THE INVENTION

Figure 1:
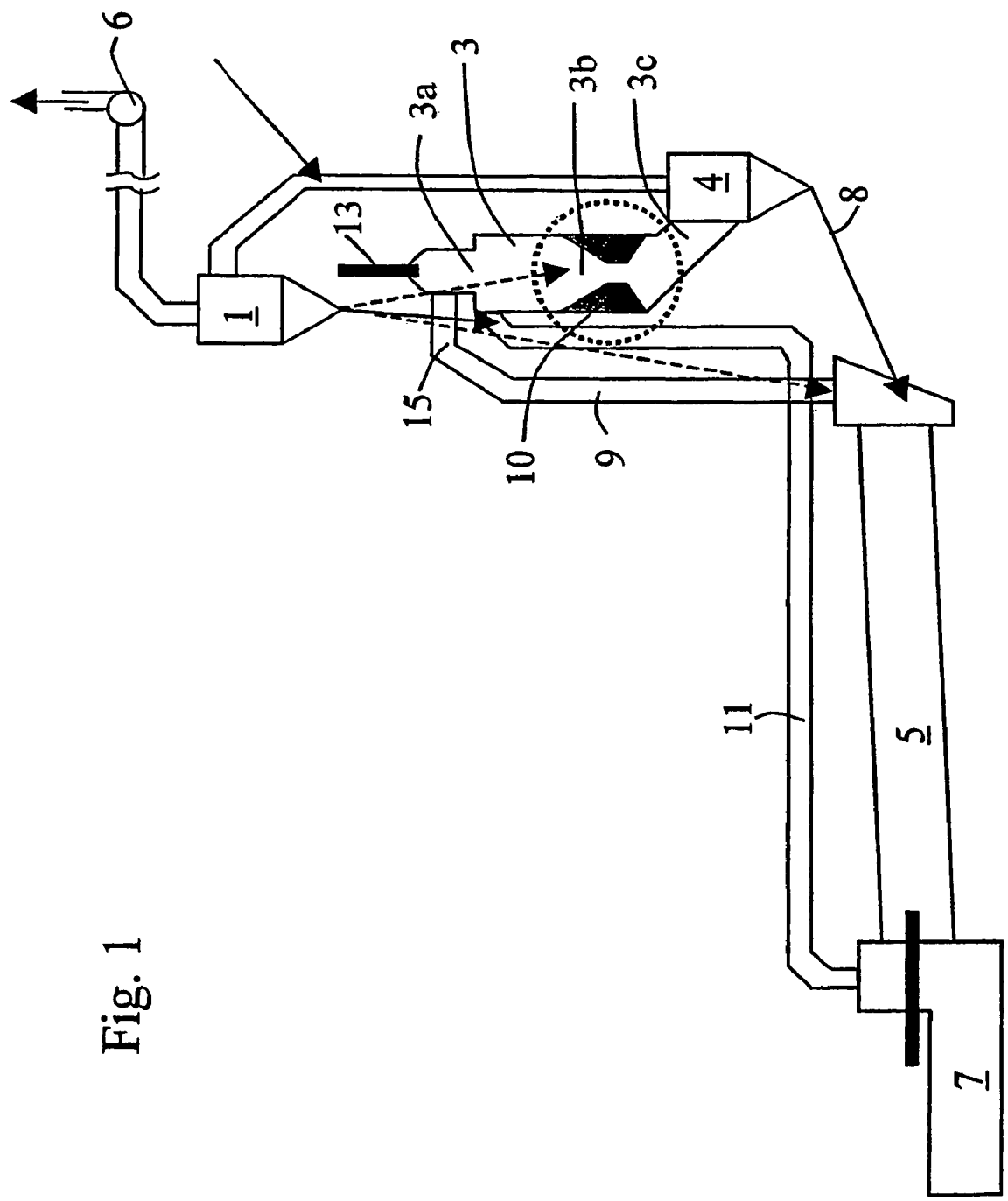
FIG. 1 shows a plant of the type ILC-D for carrying out the method according to the invention.

In FIG. 1 is shown a kiln plant of the type ILC-D for manufacturing cement clinker. This plant comprises a cyclone preheater, whereof only the last cyclone 1 is shown, a calciner 3 with separation cyclone 4; a rotary kiln 5, and a clinker cooler 7. The plant also comprises a kiln riser duct 9 for routing kiln exhaust gases to the calciner 3, and a duct 11 for directing preheated air from the clinker cooler 7 to the calciner 3. Preheated raw meal is separated from the preheater in the cyclone 1 and directed to the calciner 3 in which it is calcined. Thereafter, from the bottom outlet of the separation cyclone 4, the calcined raw meal is led via a duct 8 through to the rotary kiln 5 in which it is burned into cement clinker which is subsequently cooled in the clinker cooler 7. The exhaust gases from the rotary kiln 5 and the calciner 3 are drawn from the calciner 3 through the cyclone 4 and upstream through the preheater by means of a schematically illustrated fan 6.

In the shown embodiment fuel is introduced into the calciner 3 via a burner 13 which is arranged so that fuel is introduced axially at the top of the calciner 3, while the exhaust gases from the rotary kiln 5 are introduced via an inlet duct 15 which discharges tangentially into the upper zone 3a of the calciner. Therefore, the combustion of the fuel introduced into the calciner 3 via the burner 13 initially occurs in an atmosphere consisting of kiln exhaust gases with a low oxygen content. This will result in the generation of a reducing zone in which the $NO_x$, which is supplied together with the kiln exhaust gases reacts with the fuel, thereby reducing the $NO_x$ level.

At some point further downstream on the calciner, after a reducing zone of appropriate length, preheated air is introduced from the clinker cooler 7 via the duct 11 which discharges tangentially into the calciner 3. The main part of the preheated raw meal from the preheater is introduced into the calciner 3 as indicated at the arrow together with the air from the cooler. Because of the tangential method of introduction the cooling air/raw meal suspension will flow downward through the subsequent burn-out zone following a spiral-shaped path, whereby the raw meal will be slung out towards the wall of the calciner, where after it slides down along the calciner wall under the action of gravity, while the air from the clinker cooler will envelop the flame in the central part of the calciner, so that it is gradually mixed with the exhaust gas/fuel suspension. As a result, the amount of raw meal in the central part of the burn-out zone of the calciner will be quite small, and this means that a high temperature, and thus a high degree of fuel burn-out, can be attained even when using fuels having a low content of volatile constituents. The raw meal, which slides down along the calciner wall, is calcined by accumulation of the heat from the central burn-out zone of the calciner, and it thus serves as a heat shield protecting the calciner wall against the high temperatures, which prevail in the burn-out zone.

In the lower zone 3b of the calciner the raw meal is suspended in the downward-directed stream of exhaust gases, leading to further calcination of the raw meal and a lowering of the exhaust gas temperature. The exhaust gas/raw meal suspension is subsequently directed via a transition section 3c to the separation cyclone 4 in which the raw meal is separated from the exhaust gases and routed to the rotary kiln 5 via the bottom outlet of the cyclone 4.

For controlling the temperature in the burn-out zone and to ensure a simultaneous reduction of the discharge temperature of the exhaust gases from the calciner, a smaller amount of preheated raw meal may be introduced into the lower zone 3b of the calciner or into the transition section 3c, shown at the dotted arrow. A small amount of preheated raw meal from the preheater may further be introduced into the kiln exhaust gas stream immediately after the latter has been discharged from the rotary kiln 5 as shown at the dotted arrow. As a result, the kiln exhaust gas temperature will be lowered, thereby reducing potential caking problems in the duct 9. Because of its catalytic effect, this raw meal will also cause a further reduction of the $NO_x$ level in the calciner 3.

Figure 2:
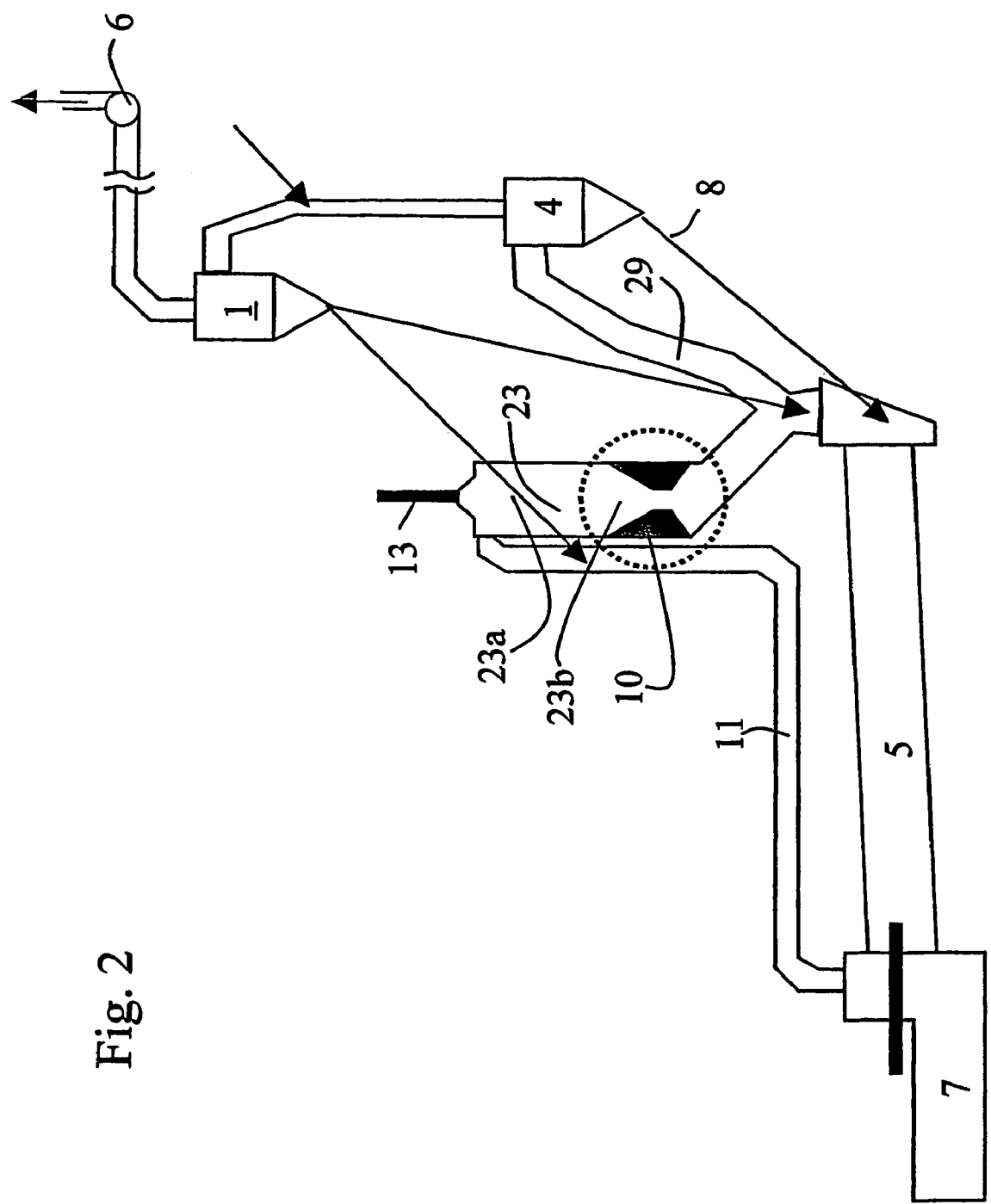
FIG. 2 shows a plant of the type SLC-D for carrying out the method according to the invention.

In FIG. 2 is shown a kiln plant of the type SLC-D for manufacturing cement clinker. This plant also comprises a cyclone whereof only the last cyclone 1 is shown, a calciner 23 with an upper zone 23a and a lower zone 23b, a rotary kiln 5, and a clinker cooler 7.

The plant also comprises a duct 11 for carrying preheated air from the clinker cooler 7 to the calciner 23. Preheated raw meal is separated from the preheater in the cyclone 1 and routed together with the air from the clinker cooler 7 to the calciner 23 in which it is calcined. The suspension of raw meal and gas is then introduced into an upwardly directed gas duct 29 in which it is mixed with the exhaust gases from the rotary kiln 5. The mixed suspension is then routed to a separation cyclone 4 from where the calcined raw meal is directed via a duct 8 to the rotary kiln 5 in which it is burned into cement clinker which is subsequently cooled in the clinker cooler 7. The exhaust gases from the rotary kiln 5 and the calciner 23 are drawn through the cyclone 4 and then up through the preheater by means of a schematically shown fan 6.

In the example shown fuel is introduced into the upper zone 23a of the calciner 23 via a burner 13 which is fitted so that fuel is introduced axially into the top of the calciner 23 while preheated air from the clinker cooler 7 is introduced via the duct 11 which discharges tangentially into the upper zone 23a of the calciner 23. The main part of the preheated raw meal from the preheater is introduced into the calciner 23 as shown at the arrow together with the air from the cooler. As is the case for the embodiment shown in FIG. 1, the suspension of cooling air and raw meal will, because of the tangential mode of introduction, flow downward through the calciner 23 following a spiral-shaped path, whereby the raw meal will be slung out towards the wall of the calciner, where after it slides down along the calciner wall under the action of gravity, while the air from the clinker cooler will envelop the flame in the central part of the calciner, so that it is gradually mixed with the fuel. As a result, the amount of raw meal in the central part of the burn-out zone of the calciner will be quite small, and this means that a high temperature, and thus a high degree of fuel burn-out, can be attained. The raw meal, which slides down along the calciner wall, is calcined by accumulation of the heat from the central burn-out zone of the calciner, and it thus serves as a heat shield protecting the calciner wall against the high temperatures, which prevail in the burn-out zone.

From the lower zone 23b of the calciner 23, the suspension of calcined raw meal and gas is subsequently introduced into the upward-directed gas duct 29 in which it is mixed with the exhaust gases from the rotary kiln 5. In the gas duct 29 calcination of any not completely calcined raw meal may be completed and fuel may also be introduced via a not shown burner. The mixed suspension is then routed as previously noted to the separation cyclone 4 from where the calcined raw meal is directed to the rotary kiln 5 via the duct 8.

The plants shown in FIGS. 1 and 2 each include a mixing unit 10 for improving the level of calcination of the raw meal as well as the burn-out efficiency of the fuel in the calciner 3, 23. This mixing unit 10 is installed in the lower zone 3b, 23b of the calciner 3, 23 in the area schematically designated by means of a dotted circle in FIGS. 1 and 2. The unit 10 is formed so that their function is primarily to brake the rotation of the exhaust gases in the lower zone 3b, 23b of the calciner 3 and secondarily to, simultaneously or subsequently, direct the combustion gas and raw meal towards the centreline of the calciner 3, 23. The result will be a much improved mixture between the raw meal and the oxygen-containing airstream concentrated nearest the calciner wall, and the hotter exhaust gases and fuel in the central zone of the calciner, enabling the raw meal to absorb a greater amount of heat from the exhaust gases and ensuring a higher fuel burn-out rate on contact with the oxygen-containing air.

Figures 3, 4:
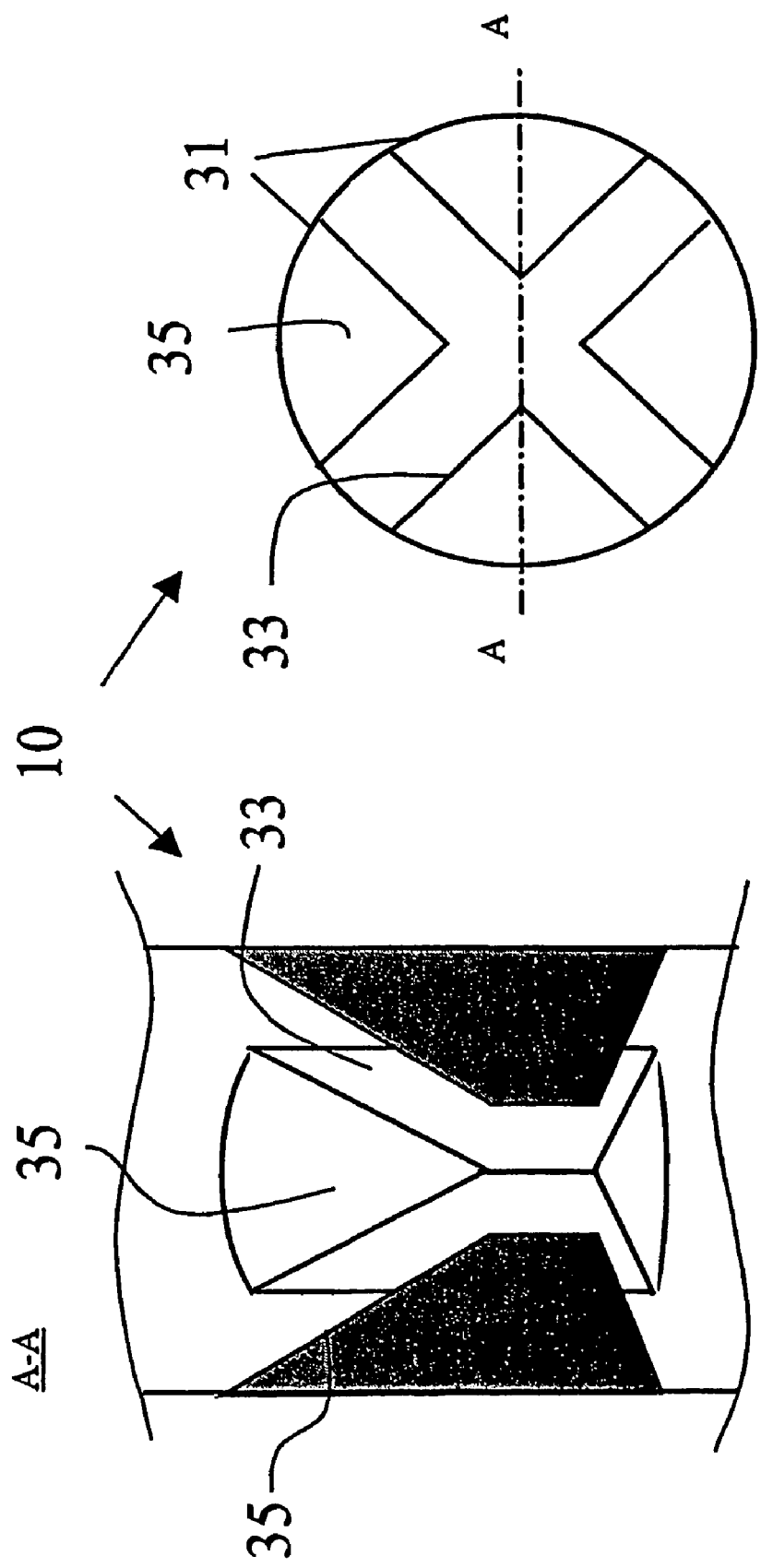
FIG. 3 shows a cross-section through a preferred embodiment of the calciner for carrying out the method according to the invention.
FIG. 4 shows a longitudinal section along the line A—A through a section of the calciner shown in FIG. 3.

FIGS. 3 and 4 show a preferred embodiment of the mixing unit 10 installed in the calciner 3, 23 according to the invention. In FIG. 3 the mixing unit 10 is seen to comprise four internal fittings 31 identically formed as right-angled circle sections and constituting between them a free space having the form of a cross. The internal fittings are, as is best illustrated in FIG. 4, formed with vertical side faces 33 and an inclined top face 35. The fittings 31 are made of metal that is protected by an inner lining. The side faces 33 will effectively brake the rotation of the gas stream while the top faces 35 will convey the gas as well as raw meal in the direction of the centre-line of the calciner, thereby forcibly ensuring greater mixing efficiency.

The invention claimed is:

1. A method for manufacturing cement clinker by which method cement raw meal is calcined in a calciner comprising an upper zone and a lower zone, where fuel, combustion gas and raw meal are introduced into the upper zone of the calciner and directed downward through the calciner, where the combustion gas and raw meal are introduced tangentially into the calciner and subject to rotation to follow a spiral-shaped flow path, and where, under the action of gravity, the raw meal is primarily directed down along the wall of the calciner, wherein the rotation of the combustion gas in at least the lower zone of the calciner is subjected to braking and in that approximately simultaneously or subsequently at least some of the combustion gas and at least some of the raw meal in the lower zone of the calciner is directed in the direction towards the centre-line of the calciner.

2. A plant for manufacturing cement clinker comprising a substantially rotation-symmetrical calciner having an upper zone and a lower zone, means for introducing fuel into the upper zone of the calciner and means for tangential introduction of combustion gas and raw meal into the upper zone of the calciner, and a mixing unit for braking the rotation of the combustion gas at least in the lower zone of the calciner and approximately simultaneously or subsequently diverting at least some of the combustion gas and at least some of the raw meal in the lower zone of the calciner in the direction towards the centre-line of the calciner.

3. A plant according to claim 2, wherein the mixing unit comprises a number of internal fittings formed with vertical side faces and inclined top face.

4. A plant according to claim 3, wherein the vertical side faces and the inclined top faces are planar.

5. A plant according to claim 3, wherein the internal fittings are formed as right-angled circle sections.

6. A plant according to claim 3, wherein the internal fittings form a cross-shaped free space there between.

* * * * *